(12) United States Patent
Oh et al.

(10) Patent No.: US 10,790,477 B2
(45) Date of Patent: Sep. 29, 2020

(54) SECONDARY BATTERY

(71) Applicant: LG Chem, Ltd., Seoul (KR)

(72) Inventors: Sei Woon Oh, Daejeon (KR); Jung Ah Shim, Daejeon (KR); Hyun Min Kim, Daejeon (KR); Seong Yoon Lim, Daejeon (KR)

(73) Assignee: LG Chem, Ltd. (KR)

( * ) Notice: Subject to any disclaimer, the term of this patent is extended or adjusted under 35 U.S.C. 154(b) by 107 days.

(21) Appl. No.: 16/068,214

(22) PCT Filed: Sep. 18, 2017

(86) PCT No.: PCT/KR2017/010208
§ 371 (c)(1),
(2) Date: Jul. 5, 2018

(87) PCT Pub. No.: WO2018/052264
PCT Pub. Date: Mar. 22, 2018

(65) Prior Publication Data
US 2019/0006636 A1    Jan. 3, 2019

(30) Foreign Application Priority Data

Sep. 19, 2016 (KR) .................. 10-2016-0119146
Sep. 13, 2017 (KR) .................. 10-2017-0117320

(51) Int. Cl.
*H01M 2/02* (2006.01)
*H01M 10/04* (2006.01)

(52) U.S. Cl.
CPC ........... *H01M 2/02* (2013.01); *H01M 2/0212* (2013.01); *H01M 2/0275* (2013.01); *H01M 10/0431* (2013.01); *H01M 10/0463* (2013.01)

(58) Field of Classification Search
CPC .... H01M 2/02; H01M 2/0212; H01M 2/0275; H01M 10/0431; H01M 10/0463
See application file for complete search history.

(56) References Cited

U.S. PATENT DOCUMENTS

| | | |
|---|---|---|
| 2001/0005561 A1 | 6/2001 | Yamada et al. |
| 2008/0070100 A1 | 3/2008 | Jang et al. |

(Continued)

FOREIGN PATENT DOCUMENTS

| | | |
|---|---|---|
| CN | 102651460 A | 8/2012 |
| CN | 104064815 A | 9/2014 |

(Continued)

OTHER PUBLICATIONS

Machine translation of KR 10-2012-0097312 (no date).*

(Continued)

*Primary Examiner* — Amanda C. Walke
(74) *Attorney, Agent, or Firm* — Lerner, David, Littenberg, Krumholz & Mentlik, LLP

(57) ABSTRACT

A secondary battery according to the present invention comprises an electrode assembly in which an electrode and a separator are alternately stacked and a battery case accommodating the electrode assembly therein, wherein the battery case comprises a stepped part that is disposed to be stepped, an outer surface of the battery case is sealed to allow a folded part to be seated on the outer surface of the stepped part, and the electrode assembly comprises a stepped protrusion that is stepped in a shape corresponding to an inner surface of the stepped part disposed on the battery case.

17 Claims, 13 Drawing Sheets

(56) References Cited

U.S. PATENT DOCUMENTS

| | | | |
|---|---|---|---|
| 2011/0287308 A1 | 11/2011 | Kim et al. | |
| 2012/0219847 A1* | 8/2012 | Hong | H01M 2/021 |
| | | | 429/163 |
| 2012/0321935 A1 | 12/2012 | Kim et al. | |
| 2013/0034763 A1 | 2/2013 | Byun | |
| 2013/0189561 A1 | 7/2013 | Kim et al. | |
| 2013/0189569 A1* | 7/2013 | Youm | H01M 10/04 |
| | | | 429/185 |
| 2013/0295436 A1* | 11/2013 | Kwon | H01M 2/266 |
| | | | 429/159 |
| 2014/0011070 A1* | 1/2014 | Kim | H01M 2/0212 |
| | | | 429/152 |
| 2015/0303414 A1 | 10/2015 | Park et al. | |
| 2015/0318579 A1 | 11/2015 | Kwon et al. | |
| 2015/0333375 A1 | 11/2015 | Kwon et al. | |
| 2015/0340733 A1 | 11/2015 | Kwon et al. | |
| 2015/0372337 A1* | 12/2015 | Kim | H01M 2/0212 |
| | | | 429/94 |
| 2017/0033407 A1* | 2/2017 | Kim | H01M 10/052 |
| 2017/0214094 A1* | 7/2017 | Ryu | H01M 2/0202 |
| 2017/0279093 A1 | 9/2017 | Park | |

FOREIGN PATENT DOCUMENTS

| | | |
|---|---|---|
| CN | 104247125 A | 12/2014 |
| CN | 104272515 A | 1/2015 |
| CN | 104781972 A | 7/2015 |
| EP | 2492989 A1 | 8/2012 |
| JP | 2000200585 A | 7/2000 |
| JP | 2001167743 A | 6/2001 |
| JP | 2011070977 A | 4/2011 |
| JP | 2011175847 A | 9/2011 |
| JP | 2015537338 A | 12/2015 |
| JP | 2019512852 A | 5/2019 |
| KR | 2008-0025436 A | 3/2008 |
| KR | 2012-0097312 A | 9/2012 |
| KR | 10-1191635 B1 | 10/2012 |
| KR | 20120138848 A | 12/2012 |
| KR | 2013-0016054 A | 2/2013 |
| KR | 2014-0015647 A | 2/2014 |
| KR | 2014-0103402 A | 8/2014 |
| WO | 2017165122 A1 | 9/2017 |

OTHER PUBLICATIONS

Machine translation KR 10-2008-0025436 (no date).*
Machine translation of KR 10-2013-0016054 (no date).*
Extended European Search Report including Written Opinion for Application No. EP17851138.2, dated Jul. 1, 2019, pp. 1-5.
International Search Report From PCT/KR2017/010208 dated Dec. 26, 2017.
Chinese Search Report for Application No. 201780007987.1 dated Aug. 5, 2020, 2 pages.

* cited by examiner

SECONDARY BATTERY

CROSS-REFERENCE TO RELATED APPLICATION

This application is a national phase entry under 35 U.S.C. § 371 of International Application No. PCT/KR2017/010208, filed Sep. 18, 2017, which claims priority to Korean Patent Application Nos. 10-2016-0119146, filed Sep. 19, 2016, and Korean Patent Application No. 10-2017-0117320, filed Sep. 13, 2017, the disclosures of which are incorporated herein by reference.

TECHNICAL FIELD

The present invention relate to a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

DISCLOSURE OF THE INVENTION

Technical Problem

One aspect of the present invention is to provide a secondary battery in which a battery case having a shape that is capable of accommodating a folded part in which a sealed portion is folded to increase in energy density.

Also, another aspect of the present invention is to provide a secondary battery that is capable of preventing a folding part of a battery case from being damaged in insulation.

Technical Solution

A secondary battery according to an embodiment of the present invention comprises an electrode assembly in which an electrode and a separator are alternately stacked and a battery case accommodating the electrode assembly therein, wherein the battery case comprises a stepped part that is disposed to be stepped, an outer surface of the battery case is sealed to allow a folded part to be seated on the outer surface of the stepped part, and the electrode assembly comprises a stepped protrusion that is stepped in a shape corresponding to an inner surface of the stepped part disposed on the battery case.

Advantageous Effects

According to the present invention, the stepped part may be disposed on the battery case to seat and accommodate the folded part, in which the sealed portion of the battery case is folded, and the electrode assembly may be disposed inside the battery case to correspond to the stepped part of the battery case to maximally secure the energy density.

Also, according to the present invention, the portion of the folded part of the battery case expect for the bent part may be sealed to prevent the sealed portion of the bent part from being damaged in insulation due to the cracks of the sealed potion.

Also, according to the present invention, the hook protrusion may be disposed on the upper end on which the folded part of the battery case is seated to prevent the end of the folded part from being separated and firmly fix the folded part without being released.

MODE FOR CARRYING OUT THE INVENTION

Figure 1:
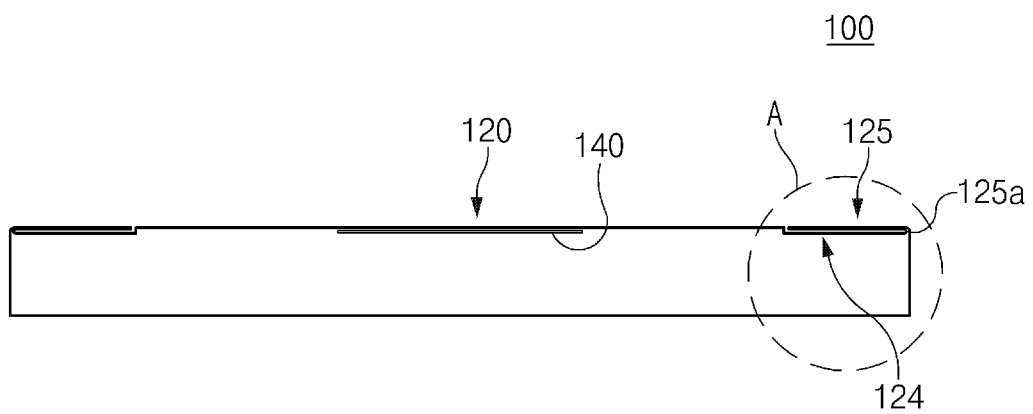
FIG. 1 is a front view of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
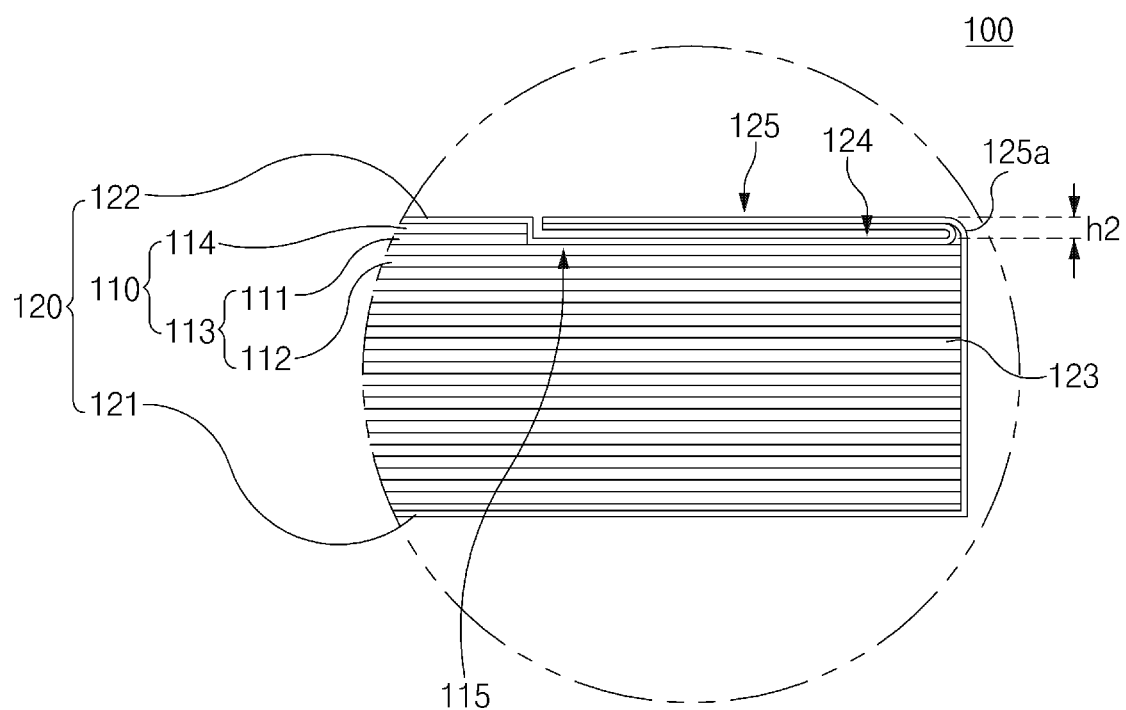
FIG. 2 is a conceptual projection view of an area A of FIG. 1.

FIG. 1 is a front view of a secondary battery according to a first embodiment of the present invention, and FIG. 2 is a conceptual projection view of an area A of FIG. 1.

Referring to FIGS. 1 and 2, a secondary battery 100 according to a first embodiment of the present invention comprises an electrode assembly 110 and a battery case 120 accommodating the electrode assembly 110. The battery case 120 comprises a stepped part 124 and a folded part 125.

Hereinafter, the secondary battery according to the first embodiment of the present invention will be described in more detail with reference to FIGS. 1 and 2.

Referring to FIGS. 1 and 2, the battery case 120 comprises an upper case 122 and a lower case to accommodate the electrode assembly 110 and an electrolyte.

The lower case 121 may comprise an accommodation part 123 accommodating the electrode assembly 110 and the electrolyte, and the upper case 122 may cover an opening portion of the accommodation part 123. Here, outer surfaces of the upper case 122 and the lower case 121 may be sealed and folded to provide the folded part 125 and then be seated on the stepped part 124.

The stepped part 124 may be stepped on an upper portion of the battery case 120. Here, the stepped part 124 may be disposed on an upper lateral portion of the battery case 120.

Also, the stepped part 124 may have an outer surface that is stepped in a shape corresponding to the folded part 125.

The folded part 125 may be manufactured by folding a sealed portion on the outer surface of the battery case 120 and comprise a bent part 125a that is bent when being folded. Here, the outer surface of the battery case 120 may be sealed and folded except for the bent part 125a. Thus, insulation damage due to cracks in the sealed portion of the bent part 125a may be prevented from occurring in a wingfolding process in which the sealed portion on an outer circumferential surface of the battery case 120 is folded. Particularly, when the battery case 120 is made of a polymer and provided as a laminate sheet, insulation damage due to cracks of a polymer layer in which the sealed portion of the bent part 125a is bent and cured may be prevented from occurring.

Also, the folded part 125 may be seated and accommodated on an outer surface of the stepped part 124.

For example, the folded part 125 may be attached to the outer surface of the stepped part 124 through a tape or an adhesive.

For another example, the folded part 125 may be fixed to the outer surface of the stepped part 124 through thermal fusion. Here, a portion of the folded part 125 except for the bent part 125a may be thermally fused and fixed to the stepped part 124.

Figure 3:
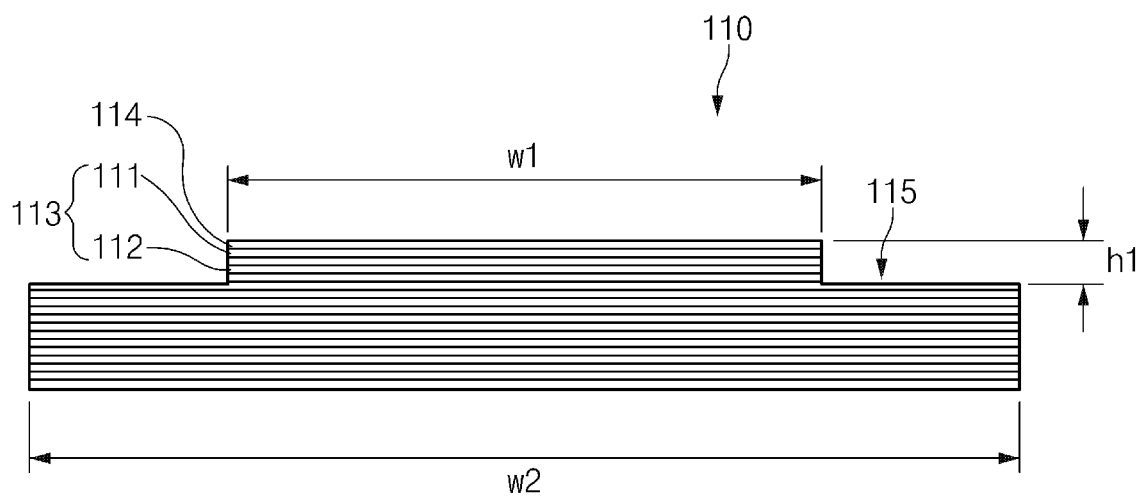
FIG. 3 is a front view of an electrode assembly in the secondary battery according to the first embodiment of the present invention.

FIG. 3 is a front view of an electrode assembly in the secondary battery according to the first embodiment of the present invention.

Referring to FIGS. 2 and 3, the electrode assembly 110 may be a chargeable and dischargeable power generation element and have a structure in which an electrode 113 and a separator 114 are combined and alternately stacked with each other.

The electrode 113 may comprise a positive electrode 111 and a negative electrode 112. Here, the electrode assembly 110 may have a structure in which the positive electrode 111/the separator 114/the negative electrode 112 are alternately stacked.

The separator 114 is made of an insulation material to electrically insulate the positive electrode 111 from the negative electrode 112. Here, the separator 114 may be made of, for example, a polyolefin-based resin film such as polyethylene or polypropylene having micropores.

Also, a stepped protrusion 115 having a shape corresponding to an inner surface of the stepped part 124 of the battery case may be disposed on an upper portion of the electrode assembly 110. Here, the stepped protrusion 115 may be disposed on an upper lateral portion of the electrode assembly 110.

Also, the stepped protrusion 115 may have a stepped height h1 corresponding to that h2 of the stepped part 124.

Furthermore, the total width w2 of the electrode assembly 110 may be narrow so that a width w1 between the electrode 113 and the separator 114, which are disposed on an upper end of the electrode assembly 110 corresponds to the stepped part 124 of the battery case 120.

An outer surface disposed along a circumference of the electrode assembly 110 may have a shape corresponding to an inner surface of the battery case 120. Here, the outer surface of the battery assembly 110 and the inner surface of the battery case 120 may be closely attached to each other.

An increment in energy density per volume of a cell may be obtained through the following equation 1.

$$D=[\{(L*A*S)-(L*B*S)\}/(L*W*S)] \quad [\text{Equation 1}]$$

D: Increment in energy density per volume
L: Height of positive electrode of cell
W: Width of positive electrode of cell
S: Number of monocell (stack)
A: Cell area loss width due to conventional folded structure
B: Uppermost positive electrode loss width due to structure of secondary battery according to first embodiment of the present invention Here, for example, when L is 250 mm, W is 100 mm, S is 29, A is 2.8 mm, and B is 14 mm, it is seen that an increment D in energy density per volume is $[\{(250*2.8*29)-(250*14*1)\}/(250*100*29)]=0.023=2.3$ (%). Thus, it is seen that the electrode assembly 110 of the secondary battery according to the first embodiment of the present invention increases in energy density.

As a result, the secondary battery 100 according to the first embodiment of the present invention may have a structure in which the stepped part 124 is disposed on the upper lateral surface of the battery case 120 to accommodate the folded part 125, and thus, only a width of a portion of a unit cell disposed on an upper end of the electrode assembly 110 increases. Thus, it is seen that the secondary battery 100 increases in energy density per volume when compared to the conventional secondary batter having a structure in which a folded part is disposed on a side surface of a battery case, and thus, an electrode assembly entirely decreases in width. That is, it is seen that the structure according to the present invention, in which the folded part 125 is accommodated into the stepped part 124 disposed on the upper lateral surface of the battery case 120 to reduce only a width of the upper end of the electrode assembly 110, increases in energy density per volume rather than the structure according to the related art, in which the folded part is folded to a side surface of the battery case to entirely decrease in width of a side surface of the electrode assembly.

Figure 4:
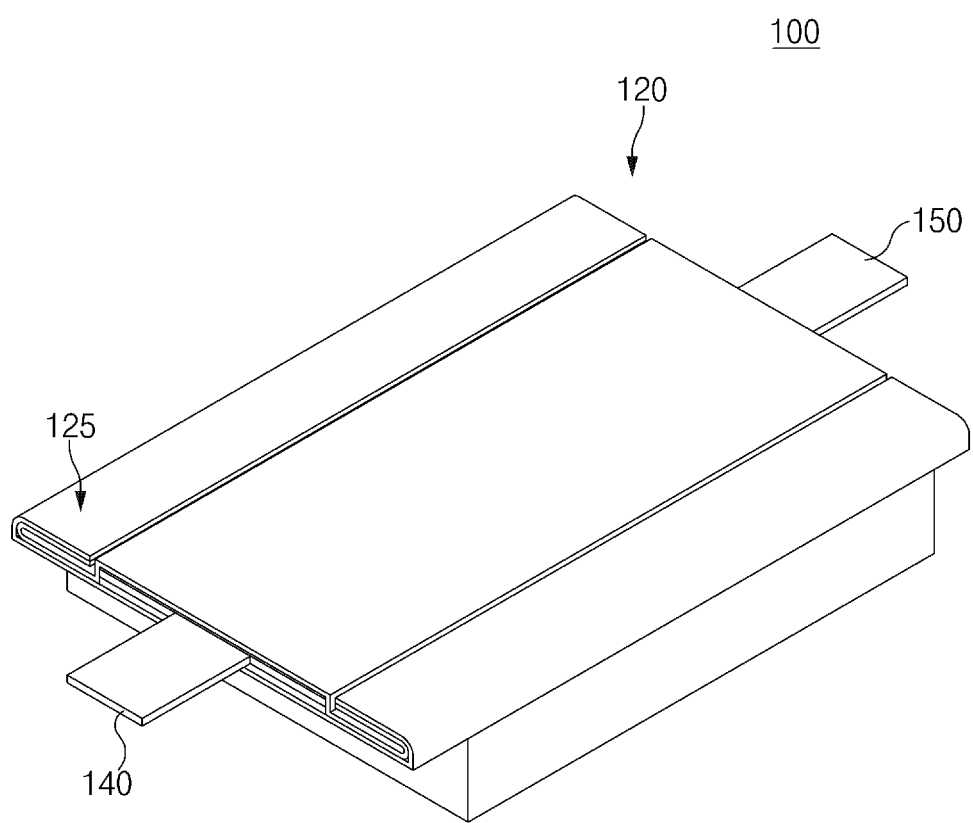
FIG. 4 is a perspective view of the secondary battery according to the first embodiment of the present invention.
Figure 5:
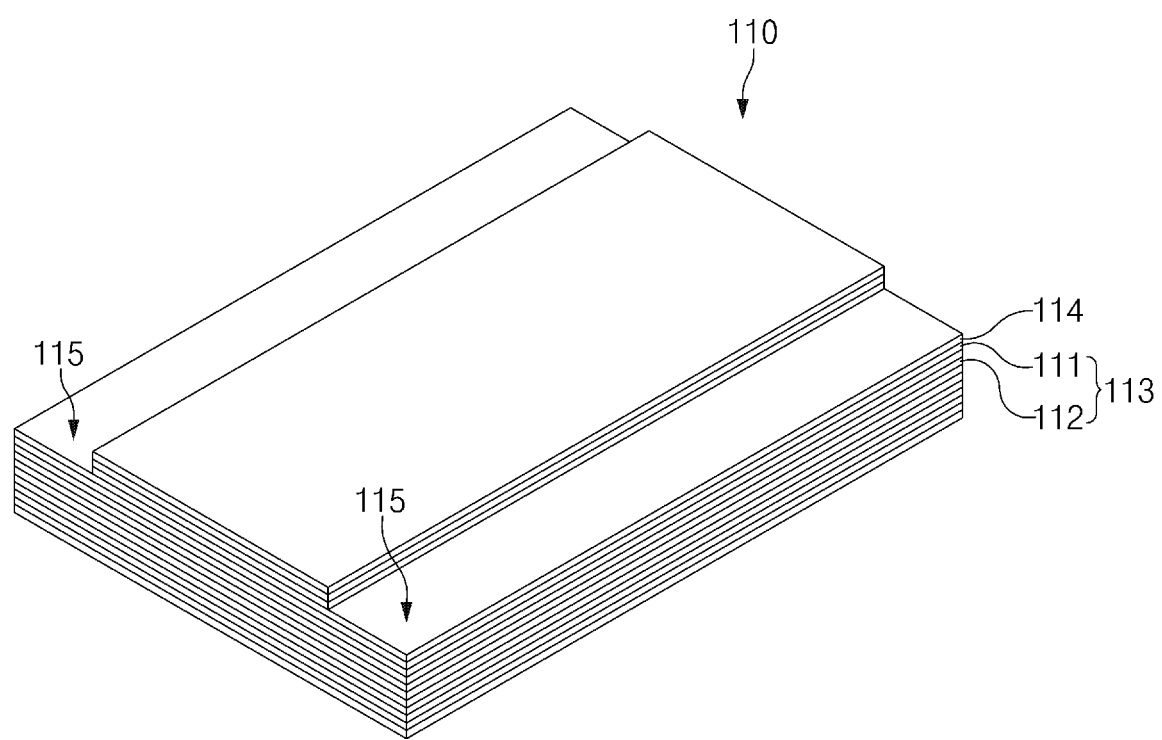
FIG. 5 is a perspective view of the electrode assembly according to the first embodiment of the present invention.

FIG. 4 is a perspective view of the secondary battery according to the first embodiment of the present invention, and FIG. 5 is a perspective view of the electrode assembly according to the first embodiment of the present invention.

Referring to FIGS. 4 and 5, the secondary battery 100 according to the first embodiment of the present invention further comprises electrode leads 140 and 150, which are electrically connected to the electrode assembly 110 to protrude and extend to the outside of the battery case 120.

The electrode leads 140 and 150 may comprise a positive electrode lead 140 electrically connected to the electrode assembly 110 and a negative electrode lead 150 electrically connected to the negative electrode 112.

Here, for example, the positive electrode lead 140 may protrude to a front end of the battery case 120, and the negative electrode 150 may protrude to a rear end of the battery case 120.

Figure 6:
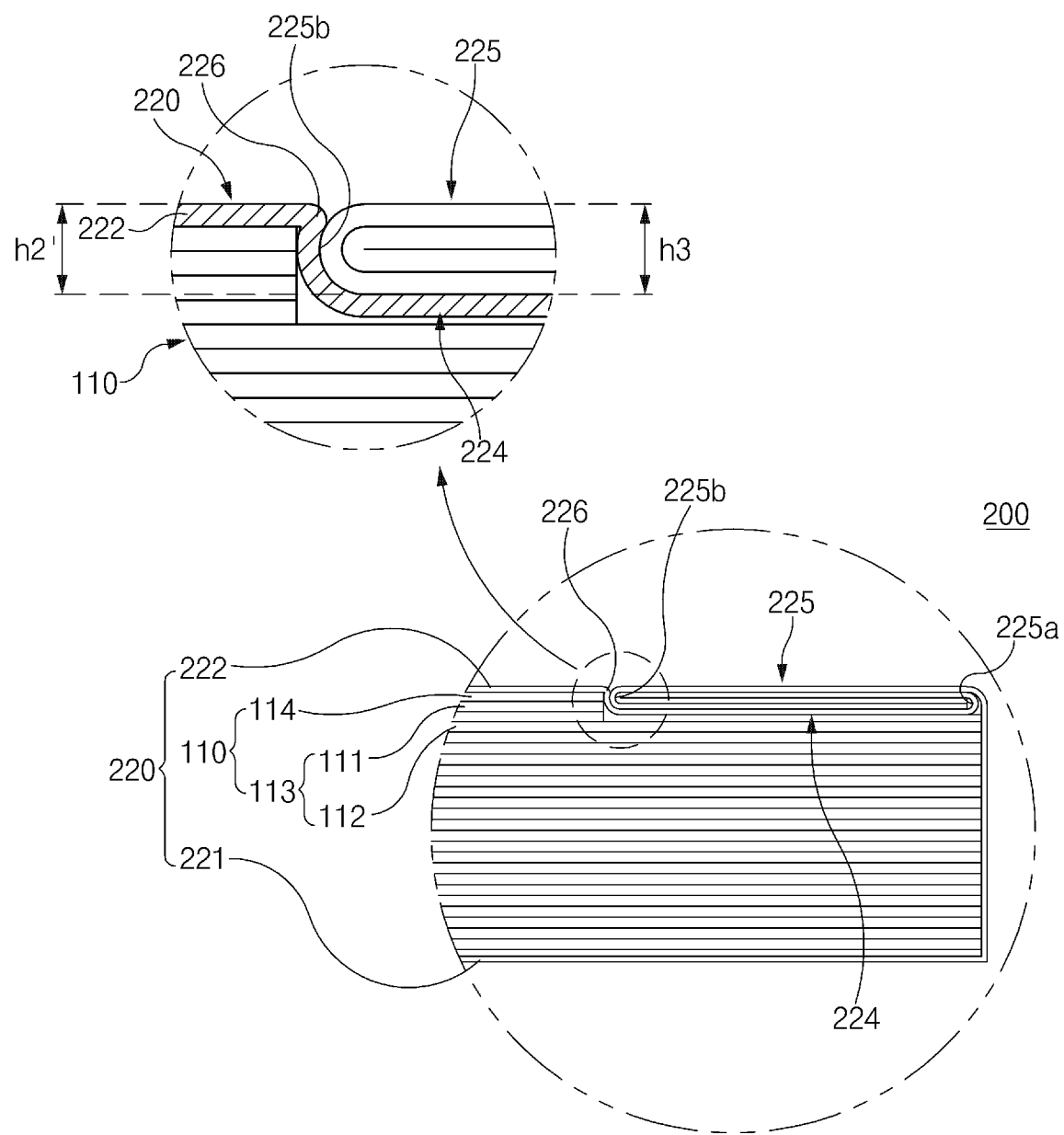
FIG. 6 is a cross-sectional view illustrating a main part of a secondary battery according to a second embodiment of the present invention.

FIG. 6 is a cross-sectional view illustrating a main part of a secondary battery according to a second embodiment of the present invention.

Referring to FIG. 6, a secondary battery 200 according to a second embodiment of the present invention comprises an electrode assembly 110 and a battery case 220. The battery case 220 comprises a stepped part 224 and a folded part 225. Here, the battery case 220 comprises an upper case 222 and a lower case 121 and also comprises a stepped part 224, a folded part 225, and a hook protrusion 226.

The secondary battery 200 according to the second embodiment of the present invention is different from the secondary battery 100 according to the first embodiment in that the folded part 225 of the battery case 220 is folded in two stages, and the hook protrusion 226 is further disposed on the battery case 220. Thus, contents of this embodiment, which are duplicated with those according to the first embodiment, will be briefly described, and also, differences therebetween will be mainly described.

In more detail, the folded part 225 may be folded in two stages from an end of an outer portion of the battery case 220 to sequentially provide a first bent part 225a and a second bent part 225b.

The hook protrusion 226 may protrude from an upper end of the stepped part 224 of the battery case 220 in a direction of the folded part 225 to catch an end of the folded part 225 so that the end of the folded part 225 is not separated from the stepped part 224.

Also, the hook protrusion 226 may be rounded, and the second bent part disposed on an end of the folded part 225 may be coupled to the hook protrusion 226 to prevent the second bent part 225b from being separated from the stepped part 224.

Here, the hook protrusion 226 may be disposed on the uppermost end of the stepped part 224 of the battery case 220 and also be press-fitted into the second bent part 225b of the folded part 225 to prevent the second bent part 225 from being separated from the stepped part 224. Here, the second bent part 225b may be bent in a rounded shape.

The stepped part 224 may have a stepped height h2' corresponding to a height h3 of the folded part 125.

Figure 7:
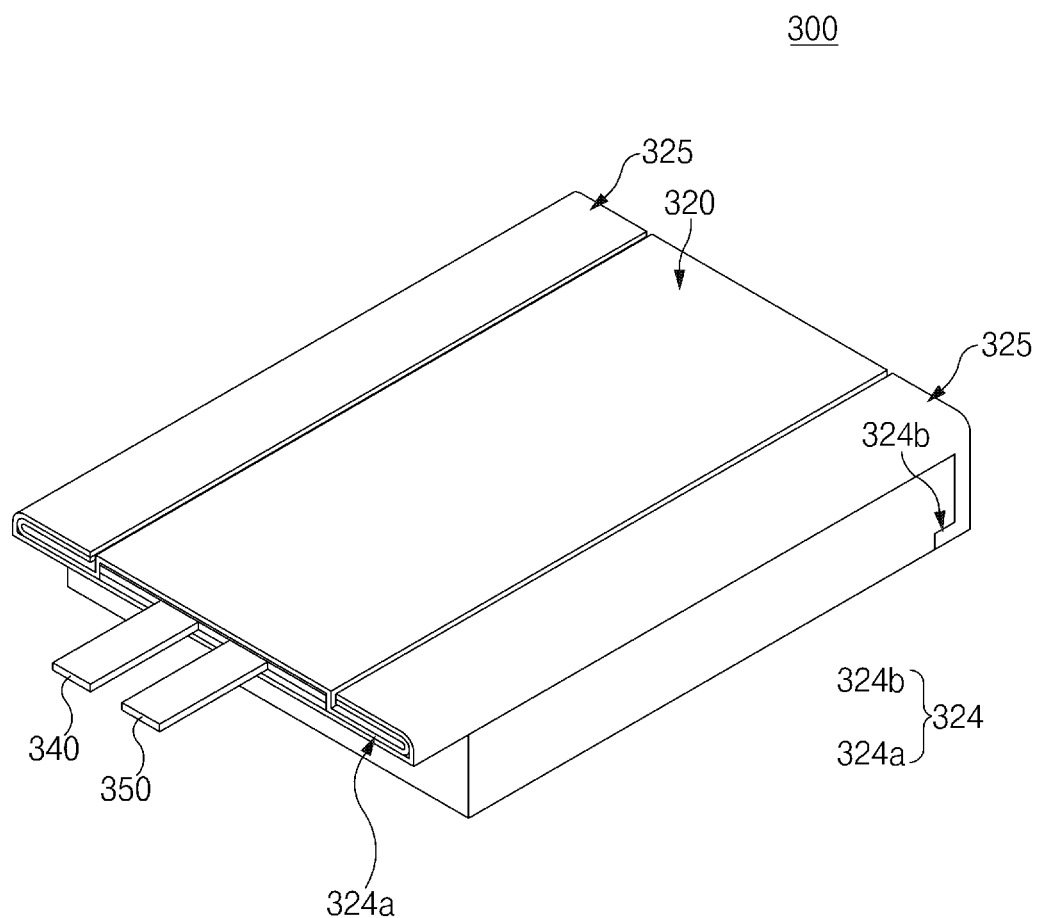
FIG. 7 is a perspective view of a secondary battery according to a third embodiment of the present invention.
Figure 8:
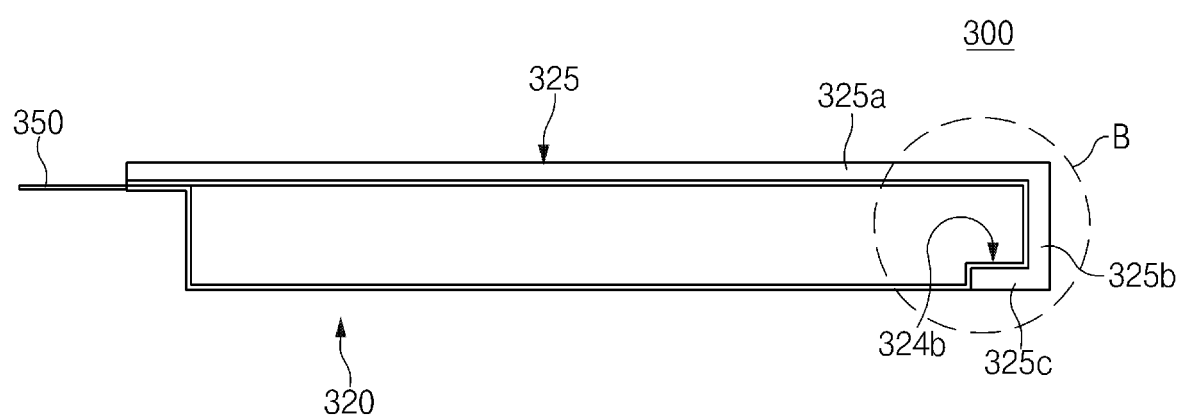
FIG. 8 is a side view of the secondary battery according to the third embodiment of the present invention.

FIG. 7 is a perspective view of a secondary battery according to a third embodiment of the present invention, and FIG. 8 is a side view of the secondary battery according to the third embodiment of the present invention.

Figure 9:
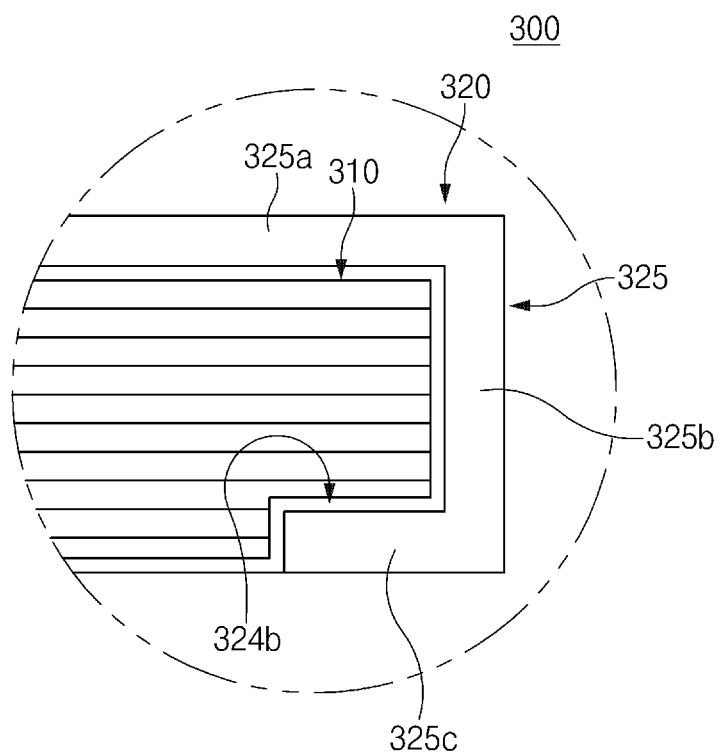
FIG. 9 is a conceptual projection view of an area B of FIG. 8.
Figure 10:
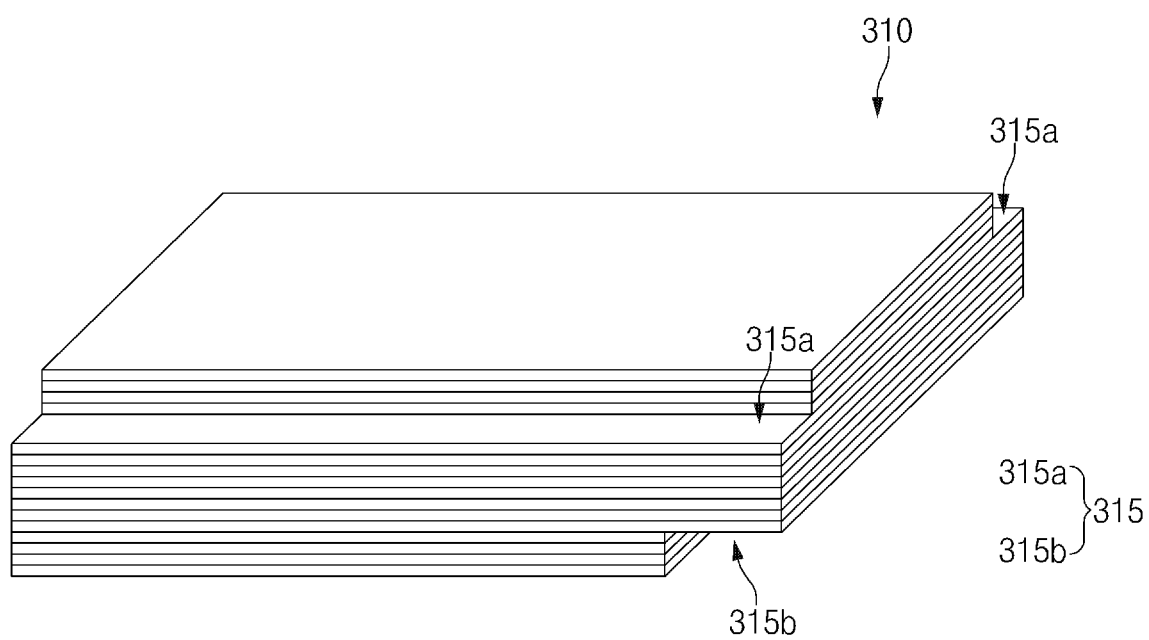
FIG. 10 is a perspective view of an electrode assembly according to the third embodiment of the present invention.

Also, FIG. 9 is a conceptual projection view of an area B of FIG. 8, and FIG. 10 is a perspective view of an electrode assembly according to the third embodiment of the present invention.

Referring to FIGS. 7 to 10, a secondary battery 300 according to a third embodiment of the present invention comprises an electrode assembly 310 and a battery case 320. The battery case 320 comprises a stepped part 324 and a folded part 325, and the electrode assembly 310 comprises a stepped protrusion 315.

The secondary battery 300 according to the third embodiment of the present invention is different from the secondary battery 100 according to the first embodiment and the secondary battery 200 according to the second embodiment in portion at which the folded part 324 of the battery case 320 and the stepped protrusion 315 of the electrode assembly 310 are disposed.

Thus, contents of this embodiment, which are duplicated with those according to the first and second embodiments, will be briefly described, and also, differences therebetween will be mainly described.

In more detail, referring to FIGS. 7 to 10, in the secondary battery 300 according to the third embodiment of the present invention, the stepped part 324 disposed on the battery case 320 may comprise a first stepped part 324a and a second stepped part 324b. Here, for example, the first stepped part 324a may be disposed on an upper lateral portion of the battery case 320, and the second stepped part 324b may be disposed on a lower rear end of the battery case 320.

Also, the stepped protrusion 315 disposed on the electrode assembly 310 may comprise a first stepped protrusion 315a and a second stepped protrusion 315b. Here, for example, the first stepped protrusion 315a may be disposed on an upper lateral portion of the battery case 310, and the second stepped protrusion 315b may be disposed on a lower rear end of the electrode assembly 310.

The upper lateral portion of the electrode assembly 310 may have a shape corresponding to the first stepped part 324a, and the lower rear end of the electrode assembly 310 may have a shape corresponding to the second stepped part 324b.

The folded part 325 may comprise a first folded part 325a that is primarily folded to be seated on the first stepped part 324a of the battery case 320, a second folded part 325b that is secondarily folded to face a rear end surface of the battery case 320, and a third folded part 325c that is tertiarily folded to be seated on the second stepped part 324b of the battery case 320.

The secondary battery 300 according to the third embodiment of the present invention may further comprise electrode leads 340 and 350, which are electrically connected to the electrode assembly 310 to protrude and extend to the outside of the battery case 320.

The electrode leads 340 and 350 may comprise a positive electrode lead 340 electrically connected to the electrode assembly 110 and a negative electrode lead 350 electrically connected to the negative electrode 112.

Here, for example, each of the positive electrode lead 340 and the negative electrode lead 350 may protrude to a front end of the battery case 320.

As described above, in the secondary battery 300 according to the third embodiment of the present invention, when the electrode leads 340 and 350 are disposed on one side of the battery case 320, the first stepped part 324a in which the first folded part 325a is accommodated may be disposed on the upper lateral portion of the battery case 320, and also, the second stepped part 324b in which the third folded part 325c is accommodated may be further disposed on the lower rear end of the battery case 320. Here, the electrode assembly 310 may have a shape corresponding to the inside of the battery case 320 to maximally secure an energy density of the secondary battery 300.

Figure 11:
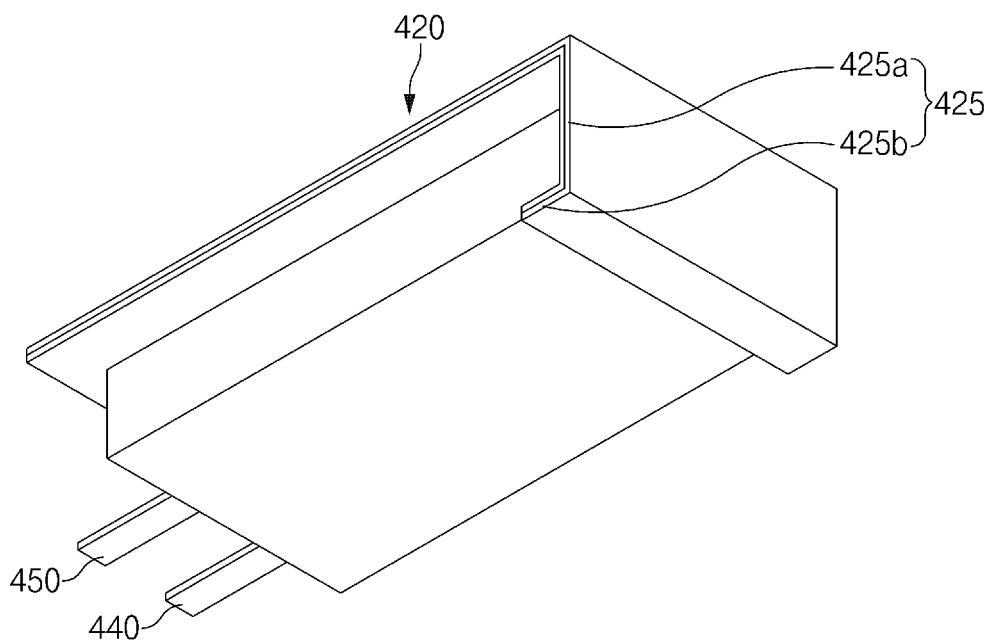
FIG. 11 is a bottom perspective view of a secondary battery according to a fourth embodiment of the present invention.
Figure 12:
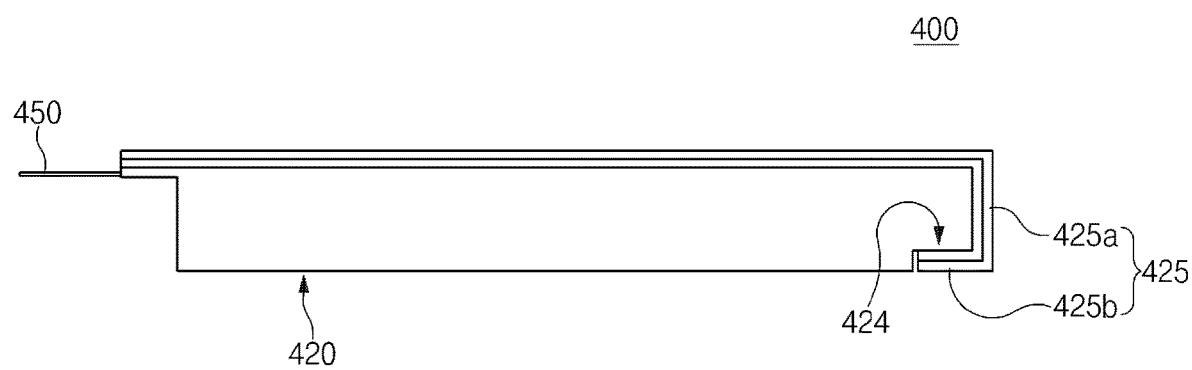
FIG. 12 is a side view of the secondary battery according to the fourth embodiment of the present invention.
Figure 13:
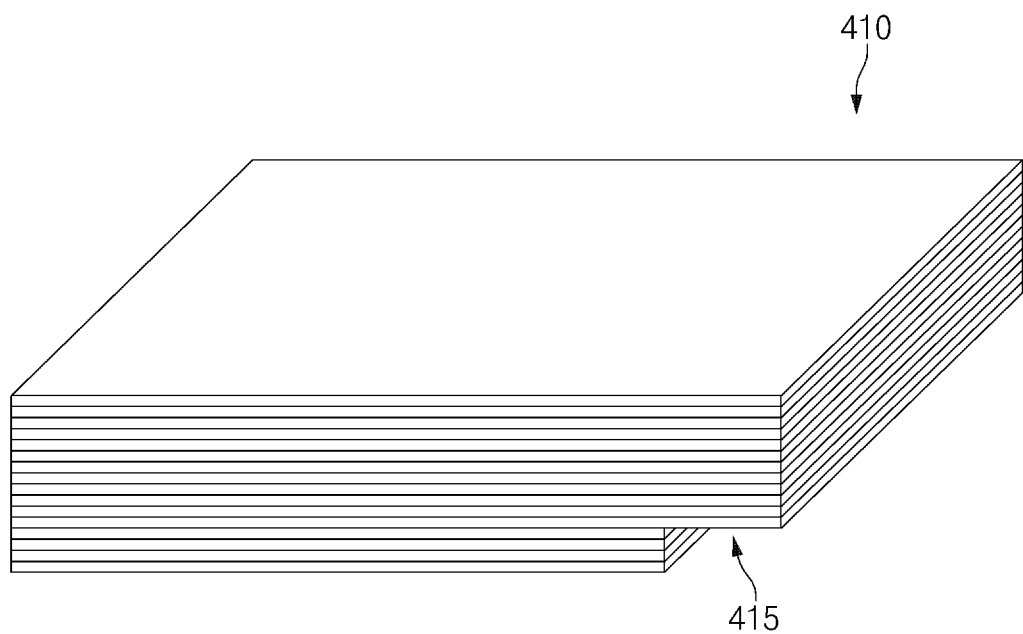
FIG. 13 is a perspective view of an electrode assembly according to the fourth embodiment of the present invention.

FIG. 11 is a bottom perspective view of a secondary battery according to a fourth embodiment of the present invention, FIG. 12 is a side view of the secondary battery according to the fourth embodiment of the present invention, and FIG. 13 is a perspective view of an electrode assembly according to the fourth embodiment of the present invention.

Referring to FIGS. 11 to 13, a secondary battery 400 according to a fourth embodiment of the present invention comprises an electrode assembly 410 and a battery case 420. The battery case 420 comprises a stepped part 424 and a folded part 425, and the electrode assembly 410 comprises a stepped protrusion 415.

The secondary battery 400 according to the fourth embodiment of the present invention is different from the secondary battery 100 according to the first embodiment, the secondary battery 200 according to the second embodiment, and the secondary battery 300 according to the third embodiment in portion at which the folded part 424 of the battery case 420 and the stepped protrusion 415 of the electrode assembly 410 are disposed.

Thus, contents of this embodiment, which are duplicated with those according to the first to third embodiments, will be briefly described, and also, differences therebetween will be mainly described.

In more detail, referring to FIGS. 10 to 12, in the secondary battery 400 according to the fourth embodiment of the present invention, the stepped part 424 disposed on the battery case 420 may be disposed on a lower rear end of the battery case 420.

Also, the stepped protrusion 415 disposed on the electrode assembly 410 may be disposed on a lower rear end of the electrode assembly 410.

The lower rear end of the electrode assembly 410 may have a shape corresponding to the stepped part 424 disposed on the lower rear end of the battery case 420.

The folded part 425 may comprise a first folded part 425a that is primarily folded to face a rear end surface of the battery case 420 and a second folded part 425b that is secondarily folded to be seated on the stepped part 424 of the battery case 420.

The secondary battery 400 according to the fourth embodiment of the present invention may further comprise electrode leads 440 and 450, which are electrically connected to the electrode assembly 410 to protrude and extend to the outside of the battery case 420.

As described above, in the secondary battery 400 according to the fourth embodiment of the present invention, when the electrode leads 440 and 450 are disposed on a front end of the battery case 420, the stepped part 424 in which the second folded part 425b is accommodated may be disposed on the lower rear end of the battery case 420. Here, the electrode assembly 410 may have a shape corresponding to the inside of the battery case 420 to maximally secure an energy density of the secondary battery 400.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
    an electrode assembly in which an electrode and a separator are alternately stacked; and
    a battery case accommodating the electrode assembly therein,
    wherein the battery case comprises a stepped part that is disposed to be stepped,
    an outer surface of the battery case is sealed to allow a folded part to be seated on the outer surface of the stepped part, and
    the electrode assembly comprises a stepped protrusion that is stepped in a shape corresponding to an inner surface of the stepped part disposed on the battery case
    wherein the stepped part of the battery case is disposed on an upper lateral portion of the battery case.

2. The secondary battery of claim 1, wherein the stepped part has an outer surface that is stepped in a shape corresponding to the folded part.

3. The secondary battery of claim 1,
    wherein the stepped protrusion of the electrode assembly is disposed on an upper lateral portion of the electrode assembly, and
    the electrode assembly has a narrow width so that a width of the electrode and the separator, which are disposed on an upper end of the electrode assembly, corresponds to the stepped part of the battery case.

4. The secondary battery of claim 3, wherein an outer surface of the stepped protrusion disposed along a circumference of the electrode assembly has a shape corresponding to the inner surface of the stepped part of the battery case, and
    the outer surface of the stepped protrusion of the electrode assembly and the inner surface of the stepped part of the battery case are closely attached to each other.

5. The secondary battery of claim 1, wherein the folded part is attached to the outer surface of the stepped part through a tape or an adhesive.

6. The secondary battery of claim 1, wherein folded part comprises a bent part, and
    the outer surface of the battery case is manufactured by sealing and folding a portion of the folded part except for the bent part.

7. The secondary battery of claim 6, wherein the portion of the folded part except for the bent part is thermally fused and fixed to the outer surface of the stepped part.

8. The secondary battery of claim 7, wherein the battery case comprises a lower case comprising an accommodation part communicating the electrode assembly and an upper case covering the accommodation part, and
    outer surfaces of the upper and lower cases are folded together to provide the folded part and are seated on the stepped part.

9. The secondary battery of claim 1, wherein the stepped part has a stepped height corresponding to a height of the folded part.

10. The secondary battery of claim 1, wherein the folded part is folded in two stages to sequentially provide a first bent part and a second bent part.

11. The secondary battery of claim 10, wherein a hook protrusion that protrudes in a direction of the folded part to catch an end of the folded part and prevent an end of the folded part from being separated from the stepped part is disposed on an upper end of the stepped part.

12. The secondary battery of claim 11, wherein the hook protrusion is rounded, and the second bent part disposed on the end of the folded part is coupled to the hook protrusion to prevent the second bent part from being separated from the stepped part.

13. The secondary battery of claim 1, wherein the stepped part of the battery case comprises a first stepped part disposed on an upper lateral portion of the battery case and a second stepped part disposed on a lower rear end of the battery case, and the stepped protrusion of the electrode assembly comprises a first stepped protrusion disposed on an upper lateral portion of the electrode assembly and a second stepped protrusion disposed on a lower rear end of the electrode assembly.

14. The secondary battery of claim 13, wherein the upper lateral portion of the electrode assembly has a shape corresponding to the first stepped part, and the lower rear end of the electrode assembly has a shape corresponding to the second stepped part.

15. The secondary battery of claim 13, wherein the folded part comprises:

a first folded part that is primarily folded to be seated on the first stepped part of the battery case;

a second folded part that is secondarily folded to face a rear end surface of the battery case; and a third folded part that is tertiarily folded to be seated on the second stepped part of the battery case.

16. The secondary battery of claim 1, wherein the stepped part of the battery case is disposed on a lower rear end of the battery case, and the stepped protrusion of the electrode assembly is disposed on a lower rear end of the electrode assembly.

17. The secondary battery of claim 16, wherein the folded part comprises:

a first folded part that is primarily folded to face a rear end surface of the battery case; and a second folded part that is secondarily folded to be seated on the stepped part of the battery case.

\* \* \* \* \*